Patented Aug. 5, 1941

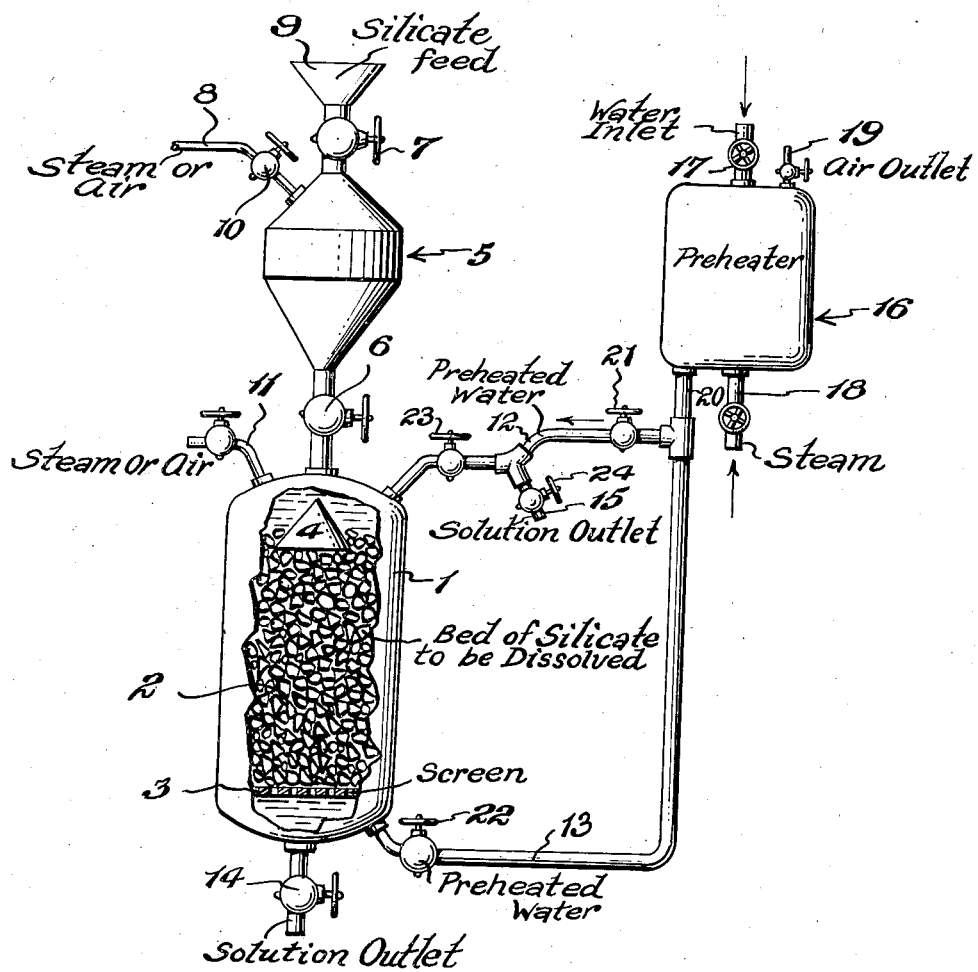

2,251,515

UNITED STATES PATENT OFFICE 2,251,515

MANUFACTURE OF ALKALI METAL SILICATE SOLUTIONS

Daniel B. Curll, Jr., Marple, Pa., assignor to Philadelphia Quartz Company, Philadelphia, Pa., a corporation of Pennsylvania Application January 23, 1939, Serial No. 252,504

19 Claims. (Cl. 23—110)

This invention relates to manufacture of alkali metal silicate solutions; and it comprises a process of preparing solutions of sodium silicate, for example, from the usual silicate glasses which are produced by fusion methods; said process comprising preheating water to a temperature of at least about 100° C. and contacting such a silicate glass therewith in the substantial absence of agitation, said process resulting in a substantial saving of time in comparison with previous methods and in the production of a solution substantially free from the usual turbidity and tendency to settle, which is characteristic of the usual commercial solutions, and also containing less dissolved heavy metal impurities either continuously or as a batch process; all as more fully hereinafter set forth and as claimed.

In the usual commercial production of water glass and other solutions of sodium silicate, a silicate glass is first produced by fusion methods and this glass is then dissolved in water by various methods. The solutions thus obtained in commercial operation have invariably been more-or-less cloudy or hazy owing to the presence of a small amount of light, finely-divided, suspended material having a tendency to settle or to produce "bottoms." The exact cause for the presence of these impurities has not been known. These solutions have also contained a considerable quantity of impurities in solution, including compounds of iron and titanium. While these impurities are not objectionable in some of the many industrial applications in which silicate solutions are used, they are particularly objectionable in certain fields, such as textile work and soap making, for example. Even when the silicate solutions are employed in such crude operations as the manufacture of cements and adhesives, it is of advantage to employ clear solutions in order to avoid the accumulation of settlings or bottoms in storage tanks and tank cars. Many attempts have been made to develop satisfactory methods for the elimination of these difficulties.

The methods which have been previously developed and used for the clarification of silicate solutions have usually involved filtration, decantation or chemical treatment. It has been proposed, for example, to add various chemicals to promote "breaking" or floc formation, with or without a simultaneous heat treatment which tends to dissolve the impurities rather than removing them from the solution. These prior methods, however, have failed to produce the desired results economically. The high cost of purification by these methods is due primarily to the high viscosity of commercial silicate solutions. This high viscosity results in a very low settling rate for any suspended impurities. Clarification of turbid silicate solutions stored in large tanks is frequently incomplete even after two years of storage. The high viscosity also makes these solutions difficult to filter, these difficulties being aggravated by the slimy condition of the filter cakes which tend to clog the filters. In order to obtain reasonable rates of settling and/or filtration, it has been necessary in many cases to dilute the silicate solutions which, of course, necessitates an expensive re-concentration operation. For these reasons the cost of water white solutions in the past has been out of line with the cost of the more turbid solutions.

One of the early methods used for the preparation of silicate solutions from silicate glasses is described in the U. S. patent to Stanton and Vail, No. 1,138,595. In this process a bed of silicate glass is introduced into a pressure vessel in which it is supported by a screen a short distance from the bottom of the vessel, water is introduced into the vessel, this water being then heated by a steam jacket as well as by direct contact with steam at its surface, no agitation being employed. This method operates satisfactorily when small pressure vessels are employed having capacities of the order of 2 to 3 gallons or when the pressure vessels are specially constructed in order to obtain a uniform distribution of heat. But when vessels of large capacity are employed, the use of a steam jacket produces a steep temperature gradient between points next to the steam jacket and interior points. Heating is very slow and as a result the dissolution of the glass is very slow. Convection currents set up in such large vessels frequently result in turbid solutions. The use of this method has therefore been abandoned in favor of methods employing agitation which are capable of producing more rapid rates of solution. In fact, to the best of my knowledge, all the commercial methods which were in use at the time of the present invention employed agitation in order to obtain economical rates of solution.

In the modern commercial processes silicate glass is digested with water heated by steam under pressures ranging up to 100 pounds per square inch. The dissolving vessels are filled with glass which is covered with water and then steam is turned on. Agitation is supplied either by rotation of the pressure vessel itself or by use of stand pipes or other devices serving to induce circulation. Even with the best circulation obtainable, the time required to achieve commercial concentration is such that it has been found necessary to employ a quantity of silicate glass in large excess of the quantity actually dissolved, that is, from about 4 to 5 times as much glass has been charged into the dissolver as is dissolved in each run. This has necessitated the use of dissolvers having a capacity much greater than that which would otherwise have been required. It has required usually from 60 to 90 minutes for the concentration of the silicate solution to build up to the standard strength of 41° Bé., for example.

In a series of tests which led to the present invention, use was made of both commercial size and pilot-plant size dissolvers. A number of interesting facts were discovered. It was found that the silicate solutions, obtained with the use of the smaller dissolvers at steam pressures of 20 to 30 pounds and without agitation, were substantially less cloudy than those obtained with commercial dissolvers at 100 pounds steam pressures and under conditions of agitation. But it was found that, when the steam pressures of the commercial dissolvers were reduced to 20 to 30 pounds, no improvement resulted. It was also found that, when agitation was substantially eliminated in the commercial dissolvers, the clarity of the resulting solutions was improved only slightly while the time required for such runs was excessive. For example, in one run 3½ hours were required for the concentration to reach 41° Bé. in contrast to the usual operating cycle of 1 hour. Simultaneous reduction in steam pressure and the elimination of agitation produced no improvement. It was noted that, with a semi-commercial dissolver, commercial gravities were obtained within a period of only 30 to 40 minutes which indicated clearly that some unknown factor was affecting the results. In the attempt to discover the cause for these differences in results, obtained with dissolvers of different size, one run was attempted in a small dissolver without the use of agitation and with the water preheated under pressure to a temperature of 170° C. In this run the surprising result was obtained that, with the use of water preheated in this manner, the solution built up to commercial gravities within a period of only 5 to 7 minutes. And when this new preheating method was employed with a commercial size dissolver then, for the first time, wholly comparable results were secured, and the effect of the capacity of the dissolver was eliminated. A dissolving period of from 5 to 7 minutes was obtained as with the smaller dissolver. It is believed that this is the first time that such a short dissolving period has been obtained in a large dissolver either with or without the use of agitation.

When the silicate solution, obtained by the use of preheated water, as described, was examined for turbidity and tendency to settle, the further surprising fact was discovered that this solution was substantially free from cloudiness or haze. In other experiments with preheated water it was found that, when silicate glasses of high purity are employed and agitation is avoided, water white, stable silicate solutions can be obtained directly from the dissolver without any clarifying treatment and with a dissolving period of only 5 to 10 minutes. It was also found that silicate solutions prepared by this method are substantially more stable than those prepared by prior commercial methods. While the usual commercial solutions, if heated for long periods of time, invariably precipitate silica in hydrous form, solutions prepared by the new method remain clear under this treatment. It was further found that, when silicate glasses containing impurities of heavy metals, such as iron and titanium, are employed in the process, a very small quantity of insoluble matter readily settles out. This residue is very dark in color, much darker than the residue obtained from solutions prepared by conventional dissolving methods. It was found that this matter can be readily removed by simple settling or filtration, leaving a silicate solution substantially clearer than that obtained by the use of other dissolving methods which include filtration and/or settling. Upon analysis of various samples of this residue, it was found that iron and titanium were present in large proportions. The silicate solutions were found to be substantially free from these impurities. As stated previously, in the silicate solutions prepared by usual methods, such iron and titanium impurities are dissolved and they cannot be removed either by filtration or settling. Apparently the use of preheated water without agitation, as in my process, changes the iron and titanium impurities in some way to a state in which they can be readily settled out or filtered off from the solution. The cause for this peculiar phenomenon is not known. A possible explanation is that, in my process, the silicate solution passes so rapidly through the concentration range within which the impurities normally present in sand are soluble that these impurities remain in a dense form which settles readily.

My further tests with this new method of dissolving silicate glasses have shown that this method does not require the use of a large excess of silicate glass in order to obtain a reasonably rapid rate of solution. Even though the theoretical quantity of glass is employed, which is required to produce a solution of a given strength this glass will dissolve completely within a period which is usually shorter than that required in previous methods in which a large excess of glass has been employed.

It has been found that the presence of an excess of silicate glass in the dissolver, while not essential in my new method, is advantageous in that the dissolving cycle is reduced. For example, in one run, in which a commercial dissolver was charged with a silicate glass, containing 1 mole of $Na_2O$ to 3.2 moles of $SiO_2$, the dissolver being charged with 4 times the quantity of glass theoretically required to produce the commercial gravity of 41° Bé., the water employed being at a temperature of 170° C., a dissolving cycle of only 7 minutes was required. After the withdrawal of the resulting solution, this dissolver was charged with preheated water without the addition of silicate glass. The second dissolving cycle was found to be only slightly longer than the first but, in the case of the third cycle, in which the ratio of silicate glass present to that dissolved had been reduced to 2:1, it required 20 minutes to complete a dissolving cycle. This forms a convenient way to conduct my process, that is, to repeatedly treat the same glass batch, until the time required for the liquid to reach the desired concentration indicates that recharging is necessary. The formation of "stickers" can be prevented by maintaining steam pressure on the dissolver between cycles. When the quantity of silica glass in the dissolver has been substantially lowered, as at the end of the third cycle, for example, the pressure can be reduced for the introduction of a new charge of glass. If a small sticker should form in this operation, it is quickly dissolved by the preheated water used in the next cycle. It has been found that stickers dissolve much more quickly in my process than in those in which the water is heated in contact with the glass. These results indicate that it is of considerable advantage to employ an excess of the silicate glass in the new process, although, even without the use of such an excess, in comparison with prior methods, the new method is capable of producing a quality of silicate solution heretofore unattainable and in a shorter time period. Of course, the dissolving rate depends upon the temperature employed as well as upon the fineness of the subdivision of the silicate glass.

In order to compare the clarity of the silicate solutions obtained by my method with those obtained in ordinary commercial practice, three different runs in a commercial dissolver were made by my method using three different commercial silicate glasses containing different amounts of impurities and having slightly different characteristics. The glasses had a ratio of $Na_2O$ to $SiO_2$ of 1 to 3.2 and the silicate solutions obtained had gravities of 41° Bé. When tested for clarity the three solutions obtained were found to test 30.2 cm., 28 cm. and 26 cm., respectively, these figures representing the depth of solution through which an operator could observe a black line on a white background, the bottom of the testing tube being held 5 inches above the line. When these solutions were allowed to stand in a tank having a diameter of 6 feet and a height of 10 feet for 24 hours, each measured over 36 cm., being water clear. In comparison with these results it was found that a solution, prepared in the same dissolver by the usual commercial method employing agitation and a high-quality silicate glass having the same silica ratio and the same gravity, had an initial clarity of only 1 cm. This solution, after standing a week in a tank of the same dimensions as that employed previously, had a clarity of 1.5 cm. Even after standing for three months the clarity of this solution was found to be only 3.9 cm. These results are representative of solutions produced by present commercial practice. Silicate solutions prepared by present practice, including a special clarification by filtering or "breaking," normally have clarities of about 25 cm. by the same test. It is therefore evident that my process produces directly solutions having an initial clarity which is slightly greater than that obtained by present methods employing special clarification procedures and that this clarity becomes substantially improved by the simple procedure of permitting the solutions to settle for 24 hours.

In a further commercial test on my method, using a silicate glass, having a silica ratio of $1Na_2O:2.50SiO_2$ and containing a large quantity of impurities, a solution having a gravity of 50° Bé. was prepared. The initial clarity of this solution was found to be 12 cm. but upon standing 48 hours, the clarity was found to be over 36 cm. It is, of course, well recognized that a silicate solution of this high gravity, prepared by usual commercial methods, cannot be clarified either by filtering or "breaking" without dilution. The present method therefore enables a water clear solution of this type to be prepared by the use of a short settling step of only 48 hours duration as the only clarifying procedure—a result which is impossible by prior art commercial methods.

It is evident from the above discussion that the mechanism of the dissolving process, which takes place upon the dissolution of silicate glasses, is but little understood. This process undoubtedly involves such phenomena as hydration, swelling, gel formation, hydrolysis, flocculation and peptization. Our knowledge of these phenomena individually leaves much to be desired. But in those cases where all or at least more than one are involved simultaneously our knowledge is, to say the least, highly empirical.

The cause for the various unexpected results obtained in my new process is not evident. There are several possible explanations. The use of preheated water in the present process insures that the temperature inside the dissolver shall be substantially uniform, corresponding throughout to the temperature of the steam above the body of water. In the prior methods, wherein the water is heated in the dissolver while in contact with the silicate, it appears at least possible that pockets are formed in the broken silicate glass which never reach the desired temperature even though the pressure above the water eventually reaches that of the steam line. Non-uniformity of temperature would imply non-uniformity of concentration. This may account for the increased rate of solution in the present process.

The cause for the elimination of turbidity in the silicate solutions, obtained by the present process is not evident. It appears that one cause for the turbidity in silicate solutions produced by prior methods is the circulation of dilute solutions of silicate in contact with the silicate glass. These dilute solutions may leach out the alkali from the silicate glass leaving more siliceous portions which, when agitation is employed, may become dispersed through the solution as agglomerates of silica. It is evident that this condition is intensified in the usual process wherein the water is heated in contact with the silicate glass under conditions of agitation. The rate of solution is low and a considerable time is required to bring the dissolver up to its maximum temperature. But lack of circulation cannot be the only explanation of the improved results secured by the present invention, since even with the most careful temperature and pressure control and a jacketed vessel which will give a minimum circulation, large scale operations consistently yield turbid solutions.

The bottoms which are formed in present commercial silicate solutions are always highly siliceous. They usually analyze between 70 to 80 per cent $SiO_2$ with small amounts of $Na_2O$ and a relatively high proportion of calcium, magnesium and aluminum. It appears probable that precipitates of this nature may be caused by the formation of agglomerates of silica resulting from the selective leaching of alkali from the silicate glass or from hydrolysis of the solution. In my process either or both of these factors may be suppressed by the rapid solution of the silicate.

It is also possible that the turbidity usually present in silicate solutions may be caused by the precipitation of complex silicates which may take place at intermediate temperatures and concentrations. The preheating of the water may cause the solution in the dissolver to pass rapidly through the concentration range in which such a precipitation may take place. And it is obvious that in my process the temperatures throughout the dissolving cycvle are maintained at a maximum value.

But whatever the explanation for the advantageous results obtained by the present process, the facts remain as stated. These favorable results are obtained only when preheated water is employed in combination with a quiescent condition in the dissolving zone during the dissolving cycle. This implies the absence of boiling in the pressure vessel which can be accomplished, of course, by a pressure of steam or air above the liquid. If preheated water is agitated throughout the cycle, turbidity results while, if cold water is employed at the start of the cycle and no agitation is used, the resulting solution will be found turbid and in addition the dissolving cycle will be unduly prolonged.

It is advantageous to avoid agitation as far as possible in my process even when the solution is being withdrawn from the dissolver. This can be accomplished by maintaining a pressure of air or other inert gas or of steam, above the silicate solution while it is being withdrawn, in order to prevent the silicate solution from boiling when in contact with the glass. If the solution is permitted to boil while being withdrawn, the resulting mechanical action causes the suspension of a fine sediment which, however, quickly settles, being thus distinguished from the turbidity which is always present when cold water is heated in contact with silicate glass in regular commercial dissolvers. It has also been found that, if the solution boils during withdrawal from the dissolver, this tends to make the residual glass in the dissolver stick together or to cake.

In order to eliminate all boiling in the pressure vessel it is sometimes necessary, when heat-insulated vessels are employed, to provide initially an interior pressure which is somewhat higher than the vapor pressure of the preheated water which is introduced. The cause for this is the development of heat on solution, which depends upon the fineness of the silicate as well as its composition. This heat of solution tends to heat the water, and thus raise the vapor pressure of the liquid, more rapidly than the boiling point of the liquid is raised due to the resultant increase in concentration. Boiling of the liquid will therefore result unless a slight excess pressure is maintained in the pressure vessel, that is, a pressure slightly above the vapor pressure of the pre-heated water. A convenient way of preventing this initial tendency to boil is to pass the preheated water from the heater to the dissolver before it has reached the temperature corresponding to the steam pressure employed in heating it. Then, if full steam pressure is maintained in the dissolver, this is sufficient to prevent boiling. The introduction of steam into the dissolver before the preheated water is introduced serves to preheat the silicate glass. This results in the substantial elimination of convection currents which would be produced if the preheated water should be contacted with a relatively cold silicate glass.

It is evident from the above that my new process results in a number of unexpected results, the more important of which are that the process substantially reduces the dissolving cycle required to produce a silicate solution of given concentration, the resulting solution is substantially less cloudy and more stable upon heating, the solution can be substantially freed from any impurities of iron, titanium, etc., by simply allowing it to settle for a short time, and the new method can be conducted with the use of theoretical quantities of silicate glass without prolonging the dissolving cycle beyond that employed in prior processes. Needless to say these results are of great importance from the standpoint of the purity of the product as well as cost of production.

In addition my process has several incidental advantages one of which is that the silicate glass does not require crushing to the same degree of fineness as that used in prior processes. It also is not necessary to use quenched or hydrated glass. Glass in blocks as large as 4" x 4" x 8" have been used successfully in my process. In fact the rate of solution is so rapid that the expense of crushing to a finer size is usually not warranted. Another incidental advantage of my process is that the water employed to dissolve the silicate can be heated at less expense in a separate vessel in which either direct or indirect heating can be employed. Since a dissolver cannot be fired directly without danger of scaling, it is evident that greater efficiency can be obtained by preheating the water in a separate vessel in which direct firing can be used. It will also be noted that my process can be conducted without substantial consumption of steam.

Owing to the very high rate of solution which is obtained in my process it is possible to conduct this process continuously. This was not considered feasible prior to the present invention owing to the long dissolving cycle and the assumption that some agitation was desirable. The continuous process can be conducted either by passing preheated water through a series of pressure vessels containing silicate glass, the vessels being replaced by freshly charged vessels as the original vessels become exhausted, or by passing the preheated water through a rather deep bed of silicate glass contained in a single pressure vessel, this bed of silicate being replenished at intervals by the introduction of fresh silicate glass, through a pressure lock, for example. In this continuous process it is important that the preheated water be passed through the silicate glass very slowly in order to avoid agitation as far as possible. The water can be introduced either at the top or at the bottom of the pressure vessel but it has been found best to introduce the preheated water at the top of the dissolver, allowing the liquid to flow downwardly over the silicate glass to be drawn off at full concentration at the bottom.

The benefits of the present invention can be realized in part even though the water used to dissolve the silicate glass is preheated only slightly. Thus, it is possible to preheat the water to a temperature of about 100° C. or above, for example, and to conduct further heating within the pressure vessel. And it is possible to use relatively low temperatures of 100° C. or slightly above in my process producing dissolving cycles of from 60 to 90 minutes. I have found, however, that the most practical operating range is from about 150-200° C. This range is selected because a sufficiently high rate of solution is obtained to make the process very economical, that is, dissolving cycles of 7 to 10 minutes are obtained which are about as rapid as can be conveniently handled by an operator. Above this range of temperature, pressures would be required which would involve special construction of pressure equipment and special piping. At lower temperatures the dissolving period increases. It is obvious, of course, that silicate glasses having various ratios of $Na_2O$ to $SiO_2$ can be used in my process. The larger the proportions of $Na_2O$ in these glasses, the shorter the dissolving period.

My invention can be described in somewhat greater detail by reference to the accompanying drawing which shows, more or less diagrammatically, an assembly of apparatus elements with which my process can be conducted. In this showing the figure represents an elevational view with certain parts broken away to show details.

The shell of the dissolver is shown at 1, this shell being broken away to show the bed of silicate glass 2 supported a short distance from the bottom by means of the screen 3. At the top of the bed of silicate glass a spreader 4 is shown which serves to distribute the silicate glass as it is introduced through the pressure lock device shown generally at 5. This pressure lock is provided with valves 6 and 7 at the bottom and the top, respectively, and also with a steam or air connection 8. A funnel 9 is employed for feeding the silicate glass to the pressure lock. This pressure lock is maintained full of silicate glass and, when additional glass is required in the dissolver, the lower valve is opened while the upper valve remains closed. Steam or air pressure may be applied to the interior of the lock by opening the valve 10. The dissolver is provided with a steam or air connection at 11, with preheated water connections 12 and 13, and with draw-offs for the silicate solution at 14 and 15.

The water preheater 16, which may be steam heated and of the so-called "open" or "closed" type or which may be fired directly, is provided with water inlet 17 and steam inlet 18 while an air outlet is provided at 19. The preheated water is withdrawn from the bottom of this preheater at 20 and may be passed through lines 12 or 13 to the heater in accordance with the setting of the valves 21 and 22. If valve 21 is closed, while valves 22, 23 and 24 are open, the preheated water passes in at the bottom of the dissolver and out through the outlet 15, whereas if the valves 22 and 24 are closed and if valves 14, 21 and 23 are open, the preheated water enters the top and leaves at the bottom of the dissolver.

The operation of the dissolver shown in the figure is believed to be obvious from the preceding description. In the batch process it is only necessary to fill the dissolver with silicate glass and then to introduce the preheated water through one of the connections 12 and 13 while the dissolver is maintained under a pressure of air or steam at least sufficient to correspond to the temperature of the preheated water and sufficient to prevent boiling of the water as it enters the dissolver. The water can be introduced either under pressure or by gravity. The water should flow into the dissolver slowly in order that there may be a minimum of agitation. As soon as commercial gravities are reached by the solution, it can be withdrawn through the draw-off 14, full steam pressures being advantageously maintained over the solution as it is being withdrawn in order to prevent boiling.

When a continuous process is employed, the preheated water may be introduced at the bottom through the connection 13 and withdrawn at 15 but it is somewhat more advantageous to introduce the preheated water at the top through the connection 12, the solution being removed from the bottom of the dissolver through the outlet 14 as rapidly as commercial gravities are secured, the dissolver being maintained substantially full of liquid. Additional silicate glass can be introduced at intervals in order to maintain the dissolver substantially full of glass. In the absence of a pressure lock, a semi-continuous process may be employed, the equipment being shut down while fresh silicate glass is introduced to replace that dissolved.

In a specific embodiment of the present process, I made use of a dissolver having a diameter of 40 inches and a height of 6 feet. This was substantially filled with a commercial silicate glass having a ratio of $SiO_2$ to $Na_2O$ of about 3.2. Steam under a pressure of 100 pounds per square inch was introduced into the dissolver and then the dissolver was filled with water preheated to a corresponding temperature (170° C.), this water being slowly passed in at the bottom. The solution was tested at rather frequent intervals and it was found that a gravity of 41° Bé. was secured in about 7 minutes. At this point the solution was withdrawn from the dissolver while full steam pressure was maintained in order to prevent the solution from boiling during withdrawal. The resulting solution was found to be substantially clear but close examination revealed the presence of a small amount of dense, dark-colored matter in suspension which settled rapidly yielding a crystal clear solution. This solution was decanted from the precipitate and, after standing for several days, it was still found to be entirely free from any precipitate.

While I have described what I consider to be the best embodiments of my process, it is evident that many modifications can be made in the specific procedures disclosed without departing from the purview of my invention. In its broad scope my invention comprises the production of a silicate solution by contacting a silicate glass with water which has been preheated to temperatures not substantially below 100° C. and maintaining the liquid in a substantially quiescent state in contact with the silicate glass. The upper limit of temperature to be employed in my process depends upon economic considerations only. The higher the temperatures used, the more expensive the equipment required. Filtration or a short settling period serves to remove any iron and titanium solids. This step is advantageous when crude raw materials are employed in the manufacture of the silicate glass which is dissolved in the process.

While the above description has been directed more particularly to the production of solutions of sodium silicate, this process can be used advantageously in producing solutions of alkali metal silicates in general. When other alkali metal silicates are employed it is usually desirable to make certain slight changes in procedure in order to adapt my method to the particular silicate employed, these changes being well within the skill of the art. In producing solutions of potassium silicate, for example, it is possible to employ somewhat lower temperatures than those set out previously owing to the fact that potassium silicates dissolve somewhat more readily at the lower temperatures. Similar changes in procedure can be made to adapt my process to the use of particular sodium silicate glasses. The more alkaline the glass the more readily it dissolves. My method is particularly adapted to sodium silicate glasses having ratios of $SiO_2$ to $Na_2O$ ranging from about 1.5:1 to 4:1. In order to obtain short dissolving cycles the silicate glass should be employed in amount equal to about 1 to 5 times the quantity dissolved in a cycle. Other modifications of this invention which fall within the scope of the following claims will be immediately evident to those skilled in this art.

What I claim is:

1. In the process of manufacturing silicate solutions from alkali metal silicate glasses, the steps which comprise preheating water to a temperature above its normal boiling point while out of contact with such a silicate glass, bringing the preheated water into contact with the silicate glass in a closed dissolving zone with the least possible agitation and maintaining the liquid and the silicate glass in a quiescent condition until a concentrated solution of the alkali metal silicate is formed, the temperature of the dissolving zone being above the boiling point of water and sufficient superatmospheric pressure being maintained in said dissolving zone to prevent boiling of the liquid.

2. The process of claim 1 wherein the temperature of the preheated water ranges from about 150° to 200° C.

3. The process of claim 1 wherein the silicate glass is a sodium silicate having a ratio of $SiO_2$ to $Na_2O$ ranging from about 1.5:1 to 4:1.

4. The process of claim 1 wherein the silicate glass is employed in an amount ranging from about the theoretical amount required to produce the desired solution to 5 times this quantity.

5. The process of claim 1 in which the resulting silicate solution is filtered for removal of a precipitate high in iron and titanium.

6. The process of claim 1 wherein a pressure of inert gas is maintained above the liquid in order to prevent boiling.

7. In the manufacture of silicate solutions from alkali metal silicate glasses, the process which comprises introducing such a silicate glass into a closed dissolving zone, passing water into the bottom of said zone with the least possible agitation, said water being preheated to temperatures above 100° C. and corresponding substantially to the maximum temperature reached in the process, maintaining the liquid in the dissolving zone quiescent and under superatmospheric pressures while in contact with the glass and withdrawing the resulting silicate solution from said dissolving zone when it becomes concentrated, with the least possible agitation.

8. The process of claim 7 wherein steam is introduced into the dissolving zone prior to the introduction of said water thereby preheating said silicate glass, the pressure of said steam being sufficient to prevent boiling of the water introduced into said zone.

9. The process of claim 7 wherein a steam pressure is maintained in said dissolving zone during withdrawal of the resulting solution sufficient to prevent boiling of said solution.

10. The process of claim 7 wherein impurities are substantially removed from the resulting solution by filtration.

11. The process of claim 7 wherein the silicate glass is a sodium silicate having a ratio of $SiO_2$ to $Na_2O$ ranging from about 1.5:1 to 4:1.

12. The process of claim 7 wherein the maximum temperatures employed in said dissolving zone are within the range of about 150° to 200° C.

13. The process which comprises establishing and maintaining a closed, unheated dissolving zone containing an alkali metal silicate glass, passing water preheated to temperatures within the range of about 150° to 200° C. and under superatmospheric pressures continuously through said zone at a rate sufficient to produce a silicate solution of substantial concentration and replenishing the silicate glass substantially as it is consumed in the process, the said water being passed through said zone slowly and with the least possible agitation.

14. The process of claim 13 wherein said preheated water is passed downwardly through said zone the resulting silicate solution being withdrawn from the bottom of said zone.

15. The process which comprises introducing an alkali metal silicate glass into a closed, unheated dissolving zone, introducing water preheated to temperatures not substantially below 100° C. into said zone, the quantity of silicate glass in said zone being substantially in excess of the quantity dissolved by said water, withdrawing the resulting silicate solution as soon as it has reached a substantial concentration, then, without replenishing the silicate glass, introducing a fresh quantity of preheated water into said zone to dissolve a second quantity of silicate, this procedure being repeated until the time required for the solution to become concentrated becomes substantially prolonged, then replenishing the silicate glass and repeating the procedure set out, the said process being conducted throughout with the least possible agitation.

16. The process of claim 15 wherein the preheated water is passed upwardly into said dissolving zone, the said zone being maintained under pressure sufficiently high to prevent boiling of said water.

17. The process which comprises introducing into a closed, unheated dissolving zone a sodium silicate glass having a silica ratio between about $1.5SiO_2:1Na_2O$ to $4SiO_2:1Na_2O$, introducing steam under superatmospheric pressure into said zone, passing water preheated to temperatures within the range of about 150° to 200° C. into said zone, the pressure of steam in said zone being sufficient to prevent the boiling of said water and quiescent conditions being maintained in the dissolving zone, whereby the resulting solution builds up to commercial gravities within a period of about 5 to 10 minutes, then withdrawing the silicate solution from said dissolving zone, the entire process being conducted with the least possible agitation.

18. In the preparation of alkali metal silicate solutions of high purity from relatively impure alkali metal silicate glasses, the process which comprises preheating water to a temperature above its boiling point, contacting the preheated water with such a silicate glass in a closed dissolving zone maintained under a superatmospheric pressure of steam for a time sufficient to produce a concentrated solution of said alkali metal silicate, withdrawing said solution from said dissolving zone with the least possible agitation and separating any suspended impurities from said solution; said process being conducted in such manner that boiling of the liquid is prevented and said liquid is maintained quiescent while in contact with said silicate glass.

19. The process of claim 18 wherein said suspended impurities are separated from the solution by settling and decantation of the clear supernatant solution from the settled impurities.

DANIEL B. CURLL, Jr.